United States Patent [19]

Fink et al.

[11] Patent Number: 5,510,301
[45] Date of Patent: Apr. 23, 1996

[54] SEALING FRIT PASTES

[76] Inventors: Kimberly S. Fink, R.D. #2, Box 27C, Arkport, N.Y. 14807; Joshua U. Otaigbe, 1222 Scott Ave., Ames, Iowa 50010

[21] Appl. No.: 328,167

[22] Filed: Oct. 24, 1994

[51] Int. Cl.6 ................................................. C03C 8/16
[52] U.S. Cl. ................. 501/20; 501/17; 501/24; 501/26; 501/45
[58] Field of Search .................. 501/15, 17, 20, 501/22, 45, 74, 73, 24, 26

[56] References Cited

U.S. PATENT DOCUMENTS

| | | |
|---|---|---|
| 2,642,633 | 3/1946 | Dalton . |
| 2,889,952 | 6/1959 | Claypoole . |
| 4,260,406 | 4/1981 | Corbett et al. ............... 501/20 X |
| 5,179,046 | 1/1993 | Francis et al. ............... 501/20 X |
| 5,246,890 | 9/1993 | Aitken et al. . |
| 5,281,560 | 1/1994 | Francis et al. . |

*Primary Examiner*—Karl Group
*Attorney, Agent, or Firm*—Clinton S. Janes, Jr.; Angela N. Nwaneri

[57] ABSTRACT

The present invention is directed to the preparation of frit pastes suitable for sealing together preformed glass parts, being especially suitable for sealing glass panels to funnels of cathode ray tubes. The pastes comprise a mixture of frit particles, a lacquer, and at least one additive in an amount of 0.0005–2% by weight total of the lacquer. The preferred additives are selected from the group of alkyl organic phosphate esters, a mixed titanium ortho ester complexes, and substituted sorbitols in the polyol acetal family.

11 Claims, No Drawings

SEALING FRIT PASTES

FIELD OF THE INVENTION

The present invention is directed to the preparation of powdered glass (frit) paste compositions suitable for sealing parts preformed from glass, metals, or ceramics. The paste compositions are especially suitable for sealing the glass panels to funnels (or tubes) in television picture tubes.

BACKGROUND OF THE INVENTION

The use of an intermediate soft sealing glass to join preformed glass parts, which sealing glass has a softening point sufficiently below that of the glass being sealed to permit the formation of a seal without any distorting flow of the preformed parts, has been recognized in the glass art for more than 40 years. U.S. Pat. No. 2,642,633 (Dalton) is illustrative of that practice. Hence, one method described therein comprised powdering (fritting) a glass, forming a slurry of that powder in a vehicle, and then flowing, brushing, or spraying the slurry onto the surfaces to be joined together. Thereafter, the parts were brought together and heated sufficiently to cause the layer of frit to flow, but not high enough to soften the glass parts themselves. The frits consisted essentially of PbO, $Al_2O_3$, $B_2O_3$, and up to 10% $SiO_2$. Dalton described the use of those sealing glasses to bond the faceplate to the funnel of a cathode ray tube.

Soft glasses of the type disclosed by Dalton frequently experienced problems when used in sealing cathode ray and other electronic tube parts. Thus, it is customary to bake out the tube, that is, to evacuate the tube while subjecting it to an elevated temperature viz., temperatures up to as high as about 500° C., to remove absorbed gases. Whether the bakeout operation is conducted concurrently with the sealing operation or is a separate subsequent step, the soft glasses were prone to become soft and flow at the temperatures involved, and, under the influence of a pressure difference, tended to slip between the sealed components. The soft glasses were also inclined to bubble or foam under vacuum and were frequently quite sensitive to heat shock.

Those problems were corrected through the development of thermally devitrifiable sealing glasses, the genesis of which is disclosed in U.S. Pat. No. 2,889,952 (Claypoole). As explained therein, the sealing glass is fritted, mixed with a conventional organic binder and vehicle to form a slurry, suspension, or paste, which is then applied to the surfaces of the parts to be joined together. The coated parts are assembled, the assembly heated to a predetermined temperature above the softening point of the glass (with either an adequate break in the heating cycle or at a sufficiently slow heating rate to assure burnout of the organic materials) to fuse the glass powders to wet the sealing surfaces and flow into the desired seal configuration, and the fused sealing glass thereafter heated at its devitrification temperature for a sufficient length of time to cause devitrification of the glass. The glass will customarily be devitrified at a temperature at least as high as the temperature at which the fused glass seal is formed.

The patent describes glass compositions within the base $PbO—ZnO—B_2O_3$ system as being especially suitable for use as devitrifible sealing glasses in sealing the panel to the funnel of a cathode ray tube, and the use of a combination of nitrocellulose and amyl acetate as the vehicle and binder, respectively. British Patent No. 863,500 disclosed specific composition intervals of devitrifiable sealing glasses within the base $PbO—ZnO—B_2O_3—SiO_2$ system, which intervals are recited below in weight percent on the oxide basis:

| PbO | 75–82 | $B_2O_3$ | 6.5–12 | ZnO | 7–14 | $SiO_2$ | 1.5–3. |
|---|---|---|---|---|---|---|---|

Up to 3% $Al_2O_3$ may advantageously be present. Other optional components totalling no more than 5% include 0–5% CdO and/or $Fe_2O_3$, 0–4% BaO, 0–1% $Li_2O$ and/or $Na_2O$, 0–1% $As_2O_3$, 0–1% $Sb_2O_3$, and 0–1% colorants.

U.S. Pat. No. 5,470,804, filed by Robert M. Morena Aug. 3, 1994 under the title MILL ADDITIONS FOR SEALING GLASSES and assigned to the same assignee as the present application, discloses sealing glass materials comprising thermally crystallizable, $PbO—Zno—B_2O_3—SiO_2$ glass frit and a mill addition selected from the group consisting of $Al_2O_3$, zircon, and $MnO_2$, the mill addition being present in an amount sufficient to increase the mechanical strength in a fusion seal to at least 55.2 MPa (8000 psi), but the amount being not over about 5% by weight of the sealing material.

Currently two $PbO—ZnO—B_2O_3—SiO_2$ base glass frits are commercially available from Corning Incorporated, Corning, N.Y., under Code Numbers 7580 and 7590. Corning Code 7580 is a vitreous sealing glass frit having the following approximate composition expressed in terms of parts by weight on the oxide basis, of

| PbO | 74.4 | $B_2O_3$ | 8.4 | BaO | 1.9 |
|---|---|---|---|---|---|
| ZnO | 12.9 | $SiO_2$ | 2.2 | $Al_2O_3$ | 0.03 |

Corning Code 7590 comprises the base glass of Code 7580 frit with about 1% by weight zircon as a mill addition to the frit. The zircon mill addition acts as a crystallization catalyst in the Code 7580 frit. It serves to initiate crystallization late in a sealing process.

In recent years pressure has been continuous to remove lead from glass compositions. That pressure has led to laboratory investigations to develop lead-free frit compositions suitable for use as sealing glasses. One composition area which has provided lead-free devitrifiable frits suitable for joining component parts in electrical and electronic devices and for sealing the panel to the funnel of a cathode ray tube comprises tin phosphate-based glasses. The following are illustrative of such glasses.

U.S. Pat. No. 5,246,890 (Aitken et al.) discloses $SnO—Zno—P_2O_5$ glasses consisting essentially, in mole percent on the oxide basis, of 25–50% $P_2O_5$ plus SnO and ZnO in amounts such that the mole ratio of SnO:ZnO is 1:1 to 5:5. Optionally, up to 20% total of modifying oxides such as up to 5 mole % $SiO_2$, up to 20 mole % $B_2O_3$, and up to 5 mole % $Al_2O_3$, as well as one or more crystallization promoters selected from the group of 1–5 mole % zircon and/or $ZrO_2$ and 1–15 mole % alkali metal oxides, may be included. The glasses are stated to be especially suitable for joining component parts in articles such as cathode ray tubes.

U.S. Pat. No. 5,281,560 (Francis et al.) reports tin phosphate-based glasses consisting essentially, in mole percent on the oxide basis, of 25–50% $P_2O_5$, 30–70% SnO, 0–15% ZnO, the mole ratio SnO:ZnO being greater than 5:1, and at least one oxide being present in an amount effective to stabilize the glass against devitrification and/or exudation during sealing up to 25% total in the indicated proportion selected from the group of 0–25% $R_2O$, wherein $R_2O$ consists of 0–25% $Li_2O$, 0–25% $Na_2O$ and 0–25% $K_2O$, 0–20% $B_2O_3$, 0–5% $Al_2O_3$, 0–5% $SO_2$, and 0–5% $WO_3$. These glasses are stated to be softer, that is, capable of forming seals at lower temperatures, than the Aitken et al. compositions, supra.

U.S. application Ser. No. 08/221,400, filed Mar. 31, 1994 by Robert M. Morena under the title FUSION SEAL AND SEALING MIXTURES discloses a sealing material comprising 60–90% by weight of a $SnO$—$ZnO$—$P_2O_5$ glass frit and 10–40% by weight of a mill addition including 10–30% $Al_2O_3$, 0–30% zircon, and 0–15% of a further additive which reduces the effective linear coefficient of thermal expansion of the seal. The glass frit consists essentially, in mole percent on the oxide basis, of 25–50% $P_2O_5$ plus SnO and ZnO in a molar ratio of 5:1 to 2:1. The glass frit may optionally contain up to 20 mole % total of at least one modifying oxide selected from the group of 0–5 mole % $SiO_2$, 0–20 mole % $B_2O_3$, 0–5 mole % $Al_2O_3$, and 0–5 mole % $WO_3$.

Lead-containing sealing glass frits are known in the prior art as being prepared with binders and vehicles (the combination of those two components being commonly referred to as lacquer) with the addition of a compatible surfactant to provide an acceptable paste. For example, lead-containing sealing frit pastes are frequently formulated utilizing a lacquer comprising a nitrocellulose/amyl acetate mixture which, through the incorporation of a compatible surfactant, yields acceptable pastes. Those pastes, however, settle and demonstrate inconsistent viscosities (resistance to flow as a function of deformation rate) and yield values (resistance to flow at zero deformation rate) with time. Thus, the lead-containing frit paste is remixed before application and the inconsistent paste viscosities are adjusted by varying the frit/vehicle ratio and/or the amount of surfactant employed. These production and application difficulties are exacerbated in the above newly developed lead-free frits primarily because of differences in the compositions and densities of the lead-containing and lead-free frits. The ratio of densities of the lead-free to the lead-containing frits is about 0.6.

Therefore, the principal objective of the present invention was to develop sealing paste formulations which are substantially non-settling and exhibit consistent viscosities and yield values, thereby improving product performance and reproducibility.

A specific objective was to develop sealing paste formulations that are useful with both lead-containing and lead-free frits.

SUMMARY OF THE INVENTION

That objective can be achieved in sealing frit paste compositions by blending glass frits into a lacquer and incorporating particular dispersants and/or thickeners (hereinafter designated collectively and individually as additives) into the lacquer. The additives are incorporated in the concentration range of about 0.0005–2% by weight of the lacquer, preferably about 0.001–1.5% by weight of the lacquer.

Whereas we have found a nitrocellulose/amyl acetate mixture to comprise the preferred lacquer, other lacquers known to the art can be considered in our inventive sealing pastes. Such lacquers include mixtures of poly (propylene carbonate) as the binder in ethyl acetate as the vehicle; mixtures of poly (ethylene oxide) as the binder in a 1:1 by volume solution of ethyl alcohol and ethyl acetate, or in water as the vehicle; mixtures of polyethylene glycol as the binder in a 1:1 by volume solution of ethyl alcohol and ethyl acetate, or in water as the vehicle; and mixtures of cellulose ethers as the binder in a 1:1 by volume solution of ethyl alcohol and ethyl acetate, or in water as the vehicle. In each lacquer the concentration of the binder component will range about 0.0005–2%, typically about 0.1–1.5% by weight, of the respective vehicle.

The preferred additives are selected from the group consisting of alkyl organic phosphate esters, mixed titanium ortho ester complexes, and substituted sorbitols in the polyol acetal family. Another additive known to the art which is not as effective, but can be used alone, is fumed silica treated with dimethyldichlorosilane. Other additives known to the art which are not effective when used alone, but can be useful as supplementary additives or can be effective when combined with one another, are hectorite clays, polyacrylic acids, polymeric fatty esters, and castor oil derivatives.

Control of the particle size of the frit and its concentration in the paste is vital in securing the desired yield-pseudoplastic rheology (analogous to the consistency of toothpaste). To illustrate:

First, with respect to particle size, we have found that the average size of the frit must be less than 35 µm; otherwise, the paste becomes too fluid to be useful for application to elements to be sealed together, and rapid settling of the fluid paste is experienced. For optimum dispersion, facility of application, and enhanced shelf life, the particle size of the frit will not exceed 25 µm and, preferably, will be 20 µm or smaller. Because of the costs involved in comminuting glass particles to very fine grain sizes, however, a practical preferred range of particle sizes has been determined at about 5–20 µm.

Second, with respect to the concentration of the frit in the paste, we have found that the lacquer plus incorporated additive(s) will comprise about 6–16% by weight of the paste to assure the production of a paste exhibiting the desired yield-pseudoplastic rheology. The preferred pastes will contain about 10–15% by weight of lacquer plus additive(s).

DESCRIPTION OF PREFERRED EMBODIMENTS

In the following examples we used our preferred lacquer which consisted of a nitrocellulose/amyl acetate mixture wherein the S nitrocellulose was present in an amount of about 1.2% by weight of the mixture. Table I records specific formulations found operable which illustrate our invention. In each example, the frit was a lead-free glass within the base $SnO$—$ZnO$—$P_2O_5$ system having the base composition recited below, expressed in terms of weight percent on the oxide basis

| | |
|---|---|
| SnO | 55.5% |
| ZnO | 8.6 |
| $P_2O_5$ | 35.9 | and was present in the form of particles having an average size not exceeding 20 µm.

As noted above in the discussion of U.S. application Ser. No. 08/221,400, mill additions (also termed fillers) are customarily added to sealing frits. These mill additions can improve the strength of the seal and/or modify the coefficient of thermal expansion of the seal and/or affect other characteristics of the seal. Ser. No. 08/221,400 discloses the addition of 10–40% by weight total of mill additions selected from the group in the indicated proportions of 10–30% $Al_2O_3$, 0–30% zircon, and 0–15% of a further component which reduces the effective linear coefficient of thermal expansion of the seal. The mill additions do not dissolve in or chemically react with the glass.

To more closely emulate commercial sealing practice, a combination of 70% by weight glass frit and 30% by weight mill additions consisting of 10% $Al_2O_3$ and 20% zircon was utilized in all of the examples reported below in Tables I–III. The average particle size of the additions was about 5–10 μm.

The additives can be blended into the lacquer either prior to dispersing the frit therein or subsequently admixed into a frit-lacquer dispersion utilizing a suitable mixer and/or disperser. The actual order of addition of the components was from top to bottom as presented in Table I. The components are reported in terms of parts by weight.

TABLE I

|  | 1 | 2 | 3 | 4 | 5 | 6 |
|---|---|---|---|---|---|---|
| Amyl Acetate | 98.8 | 98.8 | 98.8 | 98.8 | 98.8 | 49.4 |
| Nitrocellulose | 1.2 | 1.2 | 1.2 | 1.2 | 1.2 | 0.6 |
| Emphos PS21A | — | — | 0.5 | 0.5 | — | — |
| Millithix 925 | — | 1.5 | — | — | — | — |
| Cabosil TS610 | — | — | — | — | 1.0 | — |
| K-Sperse 152 | — | — | — | — | — | 1.0 |
| Dislon ns 30 | — | — | — | — | — | 1.0 |
| Frit | 600 | 600 | 600 | 600 | 300 | 300 |
| Tyzor GBA | 0.5 | — | 0.5 | — | — | — |
| Millithix 925 | — | — | — | 1.5 | — | — |

Emphos PS21A is an alkyl organic phosphate ester marketed by Witco Chemical Company, New York, N.Y. Millithix 925, marketed by Milliken Chemical Company, Inman, S.C., comprises a mixture of substituted sorbitols in the polyol acetal family. Cabosil TS610, marketed by Cabot Corporation, Tuscola, Ill., is fumed silica treated with dimethyldichlorosilane. K-Sperse 152, marketed by King Industries, Inc., Norwalk, Conn., is a zinc salt of alkyl naphthalene sulfonic acid dissolved in ethylene glycol butyl ether, the salt concentration ranging about 50–55% by weight. Dislon ns 30, marketed by King Industries, Inc., is a blend of polyamide and polyolefin waxes dispersed in 1:1 xylene and ethyl benzene mixture, the concentration of xylene being about 40–44% by weight. Tyzor GBA is a mixed titanium ortho ester complex marketed by E. I. DuPont de Nemours Company, Wilmington, Del., having the general formula $(RO)_nTi$, wherein n is typically about 4 and R represents an organic group which is selected to be compatible with the lacquer and frit system. Additionally, the structure of the R and the functional groups attached to the tetravalent titanium atom determines the effectiveness and stability of the additive and dispersant and/or anti-settling agent.

As can be observed in Table I, Emphos PS21A, K-Sperse 152, and Dislon ns 30 are co-additives only; they do not function efficiently when used alone.

Whereas the preferred base glass frits are lead-free, to illustrate that the present invention permits the development of sealing paste formulations utilizing lead-containing frits which are substantially nonsettling and exhibit consistent viscosities and yield values, the following experiments were carried out.

TABLE II

|  | 7 | 8 | 9 | 10 | 11 | 12 |
|---|---|---|---|---|---|---|
| Amyl Acetate | 98.8 | 98.8 | 98.8 | 98.8 | 98.8 | 98.8 |
| Nitrocellulose | 1.2 | 1.2 | 1.2 | 1.2 | 1.2 | 1.2 |
| Emphos PS-21A | — | — | 0.5 | 0.5 | — | — |
| Millithix 925 | — | 1.5 | — | — | — | — |
| Cabosil TS-610 | — | — | — | — | 1.0 | — |
| K-Sperse 152 | — | — | — | — | — | 2.0 |
| Dislon ns-30 | — | — | — | — | — | 2.0 |
| 7590 frit | 900 | 900 | 900 | 900 | 900 | 900 |
| Tyzor GBA | 0.5 | — | — | — | — | — |
| Millithix 925 | — | — | — | 1.5 | — | — |

In like manner to the lead-free frits described above, the additions can be blended into the lacquer prior to dispersing the frit therein or subsequently admixed into a frit-lacquer dispersion utilizing a suitable mixer and/or disperser. The actual order of addition of the components was from top to bottom as recited in Table II. The components are reported in terms of parts by weight.

In like manner to their use in lead-free frits, K-Sperse 152 and Dislon ns 30 are co-additives only. Emphos PS21A, in contrast, functions efficiently alone when used with lead-containing frits. We have not derived a rigorous answer for this behavior of Emphos PS21A with lead-containing frits as opposed to its behavior with lead-free frits.

The additives of this invention, by their very nature, are believed to exhibit their particle suspension ability and/or desired rheology through the formation of structures around the particles. These structures provide pseudo-crosslinks between particles and are stable at low shear rates, but undergo reversible breakdown at high shear rates. It is this behavior of the additives in the frit paste system that makes them advantageous in this application because paste stability at low shear rates and reversible structure breakdown are required during the end use application of the paste.

As can be observed in Tables I and II, Emphos PS21A, K-Sperse 152, and Dislon ns 30 are co-additives only; they do not function efficiently when used alone.

Table III recites examples of commercially marketed additives which do not yield the desired particle suspension ability and/or rheology. The order of addition of the components, reported in terms of parts by weight, is as listed from top to bottom in Table III. The frit was the same glass composition as that used in the examples reported in Table I.

TABLE III

|  | 13 | 14 | 15 |
|---|---|---|---|
| Amyl Acetate | 98.8 | 49.4 | 49.4 |
| Nitrocellulose | 1.2 | 0.6 | 0.6 |
| Bentone EW | 1.0 | — | — |
| K-Sperse 152 | — | 1.0 | — |
| Dislon KS873N | — | — | 1.0 |
| Dislon ns30 | — | 2.0 | 1.0 |
| Frit | 600 | 300 | 300 |

Bentone EW, marketed by Rheox, inc. Hightstown, N.J., is a hectorite clay gelling agent. Dislon KS873N, marketed by King Industries, Inc., Norwalk, Conn., comprises high molecular weight non-ionic and ionic surfactants dispersed in 1:1 xylene and ethyl benzene mixture, the concentration of xylene being about 40–44% by weight. The surfactants constitute about 50% by weight of the material. It is of interest to compare Example 6 with Example 14, the latter composition containing excess additive.

The use of a combination of Emphos PS21A and Tyzor GBA with lead-free frits is considered to be the best embodiment of our invention.

What is claimed is:

1. A frit paste formulation designed for sealing preformed glass parts comprising a mixture of lead-free glass frit particles in a lacquer with 0.0005–2% by weight total of said lacquer of an additive selected from the group consisting of a substituted sorbitol in the polyol acetal family, a fumed silica treated with dimethyldichlorosilane, a mixture of (i) a titanium ortho ester complex having the general formulate $(RO)_n Ti$, wherein n is about 4 and R represents an organic group which is compatible with the lacquer and frit, and (ii) an alkyl organic phosphate ester, one of the above additives in conjunction with a co-additive selected from the group consisting of hectorite clay; a polyacrylic acid; a polymeric fatty ester; castor oil; and a 50–55% by weight solution of a zinc salt of alkyl naphthalene sulfonic acid in alkyl glycol butyl ether; and a blend of two or more of the co-additives with one another.

2. A frit paste formulation according to claim 1 wherein said additive is incorporated in an amount of 0.001–1.5% by weight of said lacquer.

3. A frit paste formulation according to claim 1 wherein said lacquer plus additive(s) comprises about 6–16% by weight of said paste.

4. A frit paste formulation according to claim 1 wherein the composition of said lacquer is selected from the group consisting of a mixture of nitrocellulose as a binder in amyl acetate as a vehicle, a mixture of poly(propylene carbonate) as a binder in ethyl acetate as a vehicle, a mixture of poly (ethylene oxide) as a binder in a 1:1 by volume solution of ethyl alcohol and ethyl acetate, or in water as a vehicle, a mixture of polyethylene glycol as a binder in a 1:1 by volume solution of ethyl alcohol and ethyl acetate, or in water as a vehicle, and a mixture of a cellulose ether as a binder in a 1:1 by volume solution of ethyl alcohol and ethyl acetate, or in water as a vehicle.

5. A frit paste formulation according to claim 4 wherein the concentration of said binder in each lacquer ranges about 0.05–2% by weight of said vehicle.

6. A frit paste formulation according to claim 1 wherein said frit has a composition encompassed within a SnO—ZnO—$P_2O_5$ system.

7. A frit paste formulation according to claim 6 wherein said frit consists essentially, expressed in terms of mole percent on the oxide basis, of 25–50% $P_2O_5$ plus SnO and ZnO in amounts such that the mole ratio of SnO:ZnO is 1:1 to 5:1 with, up to 20% total of modifying oxides selected from the group consisting of 0–5% $SiO_2$, 0–20% $B_2O_3$, and 0–5% $Al_2O_3$, and at least one crystallization promoter selected from the group consisting of 1–5% zircon and/or $ZrO_2$ and 1–15% alkali metal oxides.

8. A frit paste formulation according to claim 6 wherein said frit consists essentially, expressed in terms of mole percent on the oxide basis, of 25–50% $P_2O_5$, 30–70% SnO, up to 15% ZnO, such that the mole ratio of SnO:ZnO is greater than 5:1, and at least one oxide being present in an amount to stabilize the glass against devitrification and/or exudation during sealing up to 25% total in an amount selected from the group consisting of 0–25% $R_2O$, wherein $R_2O$ consists of 0–25% $Li_2O$, 0–25% $Na_2O$, and 0–25% $K_2O$, 0–20% $B_2O_3$, 0–5% $Al_2O_3$, 0–5% $SiO_2$, and 0–5% $WO_3$.

9. A frit paste formulation according to claim 6 comprising 60–90% by weight of a SnO—ZnO—$P_2O_5$ glass frit and 10–40% by weight of a mill addition including 10–30% $Al_2O_3$, 0–30% zircon, and 0–15% of a further additive which reduces the effective linear coefficient of thermal expansion of the seal, said glass frit consisting essentially, expressed in terms of mole percent on the oxide basis, of 25–50% $P_2O_5$ plus SnO and ZnO being present in amounts such that the mole ratio of SnO:ZnO is between 5:1 to 2:1 with, up to 20 mole percent total of at least one modifying oxide selected from the group consisting of 0–5% $SiO_2$, 0–20% $B_2O_3$, 0–5% $Al_2O_3$, and 0–5% $WO_3$.

10. A frit paste formulation according to claim 1 wherein the additive consists of a mixture of (i) a titanium ortho ester complex having the general formula $(RO)_n Ti$, wherein n is about 4 and R represents an organic group which is compatible with the lacquer and frit, and (ii) an alkyl organic phosphate ester.

11. A frit paste formulation designed for sealing preformed glass parts comprising a mixture of lead-free glass frit particles in a lacquer with 0.0005–2% by weight total of said lacquer of an additive selected from the group consisting of (1) a substituted sorbitol in the polyol acetal family; (2) a fumed silica treated with dimethyldichlorosilane; (3) a mixture of (i) a titanium ortho ester complex having the general formula $(RO)_n Ti$, wherein n is about 4 and R represents an organic group which is compatible with the lacquer and frit, and (ii) an alkyl organic phosphate ester; (4) a blend of two or more co-additives selected from the group consisting of hectorite clay; a polyacrylic acid; a polymeric fatty ester; and castor oil.

* * * * *

UNITED STATES PATENT AND TRADEMARK OFFICE
CERTIFICATE OF CORRECTION

PATENT NO. : 5,510,301
DATED : April 23, 1996
INVENTOR(S) : Kimberly S. Fink and Joshua U. Otaigbe It is certified that error appears in the above-indentified patent and that said Letters Patent is hereby corrected as shown below:

Column 2, line 47, "1:1 to 5:5" should read --1:1 to 5:1--.

Column 4, line 42, "the S nitrocellulose" should read --the nitrocellulose--.

Signed and Sealed this

Thirtieth Day of July, 1996

Attest:

BRUCE LEHMAN

*Attesting Officer*   *Commissioner of Patents and Trademarks*